(12) United States Patent
Lai

(10) Patent No.: US 9,964,390 B2
(45) Date of Patent: May 8, 2018

(54) STANDABLE SURVEYOR WHEEL

(71) Applicant: TOP MEASURE INSTRUMENT COMPANY, Taichung (TW)

(72) Inventor: Yin-Wu Lai, Taichung (TW)

(73) Assignee: TOP MEASURE INSTRUMENT COMPANY, Taichung (TW)

( * ) Notice: Subject to any disclaimer, the term of this patent is extended or adjusted under 35 U.S.C. 154(b) by 107 days.

(21) Appl. No.: 15/244,154

(22) Filed: Aug. 23, 2016

(65) Prior Publication Data

US 2018/0058831 A1    Mar. 1, 2018

(51) Int. Cl.
*G01B 3/12*    (2006.01)
(52) U.S. Cl.
CPC ..................... *G01B 3/12* (2013.01)
(58) Field of Classification Search
CPC .......................................................... G01B 3/12
USPC ..................................................... 33/772–782
See application file for complete search history.

(56) References Cited

U.S. PATENT DOCUMENTS

| | | | | |
|---|---|---|---|---|
| 3,441,209 A * | 4/1969 | Farman | ..................... | G01B 3/12 235/121 |
| 9,797,438 B1 * | 10/2017 | Wang | ..................... | F16C 11/10 |
| 2011/0180626 A1 * | 7/2011 | Kang | ..................... | A63C 19/065 239/225.1 |
| 2012/0102772 A1 * | 5/2012 | Nepil | ..................... | G01B 3/12 33/701 |
| 2013/0133212 A1 * | 5/2013 | Lai | ..................... | G01B 3/12 33/203 |
| 2013/0133217 A1 * | 5/2013 | Lai | ..................... | G01B 3/12 33/782 |
| 2014/0317944 A1 * | 10/2014 | Kumagai | ..................... | G01C 5/00 33/773 |
| 2017/0370687 A1 * | 12/2017 | Lai | ..................... | G01B 3/12 |
| 2018/0023962 A1 * | 1/2018 | Shi | ..................... | G01C 21/3407 |

* cited by examiner

*Primary Examiner* — G. Bradley Bennett
(74) *Attorney, Agent, or Firm* — Ming Chow; Sinorica, LLC

(57) ABSTRACT

A surveyor wheel has an assembling seat, a supporting element, a handle, and two wheels. The assembling seat has a moving direction, an upper surface, a lower surface, and two opposite ends. The upper surface of the assembling seat and the lower surface of the assembling seat are opposite each other. The supporting element is formed on the assembling seat, protrudes downward, and has a supporting end. The handle is formed on the assembling seat. The two wheels are rotatable and are respectively connected to the two opposite ends of the assembling seat. The supporting end of the supporting element is to abut against the ground or a horizontal surface to provide support.

11 Claims, 5 Drawing Sheets

US 9,964,390 B2

STANDABLE SURVEYOR WHEEL

BACKGROUND OF THE INVENTION

1. Field of the Invention

The present invention relates to a measuring arrangement characterized by using mechanical means, and more particularly to a surveyor wheel with a supporting element that can retain the surveyor wheel to stand independently.

2. Description of Related Art

A surveyor wheel is an apparatus that is utilized to measure a ground distance. It is either commonly presented in an accident site to measure lengths of skid marks appearing in the accident site, or is frequently employed in a pavement maintenance site to measure the lengths of road surface markings. The surveyor wheel is also applied for piping, land area measuring, architectural engineering, or interior decorating.

There are two types of conventional surveyor wheels. The first type of the conventional surveyor wheel has a single wheel and a kickstand. The kickstand is attached on a rear side of the first type of the conventional surveyor wheel or an opposite side of the wheel. The kickstand enables the first type of conventional surveyor wheel to stand erectly for ease in storage and access.

The second type of the conventional surveyor wheel has dual wheels and a handle. Although the conventional surveyor wheel with dual wheels has better balance than the conventional surveyor wheel with a single wheel, the conventional surveyor wheel with dual wheels cannot stand independently. The handle has to abut on a wall or a supporting object to keep the conventional surveyor wheel with dual wheels standing erectly. Once an angle measured between the handle and the supporting object changes, the dual wheels rotate, causing the conventional surveyor wheel with dual wheels to fall down.

To overcome the shortcomings of the conventional surveyor wheel with dual wheels, the present invention provides a standable surveyor wheel to mitigate or obviate the aforementioned problems.

SUMMARY OF THE INVENTION

The main objective of the present invention is to provide a surveyor wheel that is able to remain standing independently and is easy for storage and access.

The surveyor wheel comprises an assembling seat, a supporting element, a handle, and two wheels. The assembling seat has a moving direction, an upper surface, a lower surface, and two opposite ends. The upper surface of the assembling seat and the lower surface of the assembling seat are opposite each other. The supporting element is formed on the assembling seat, protrudes downward, and has a supporting end. The handle is formed on the assembling seat. The two wheels are rotatable and are respectively connected to the two opposite ends of the assembling seat. The supporting end of the supporting element is to abut against the ground or a horizontal surface to provide support.

Other objects, advantages, and novel features of the invention will become more apparent from the following detailed description when taken in conjunction with the accompanying drawings.

DETAILED DESCRIPTION OF PREFERRED EMBODIMENT

Figure 1:
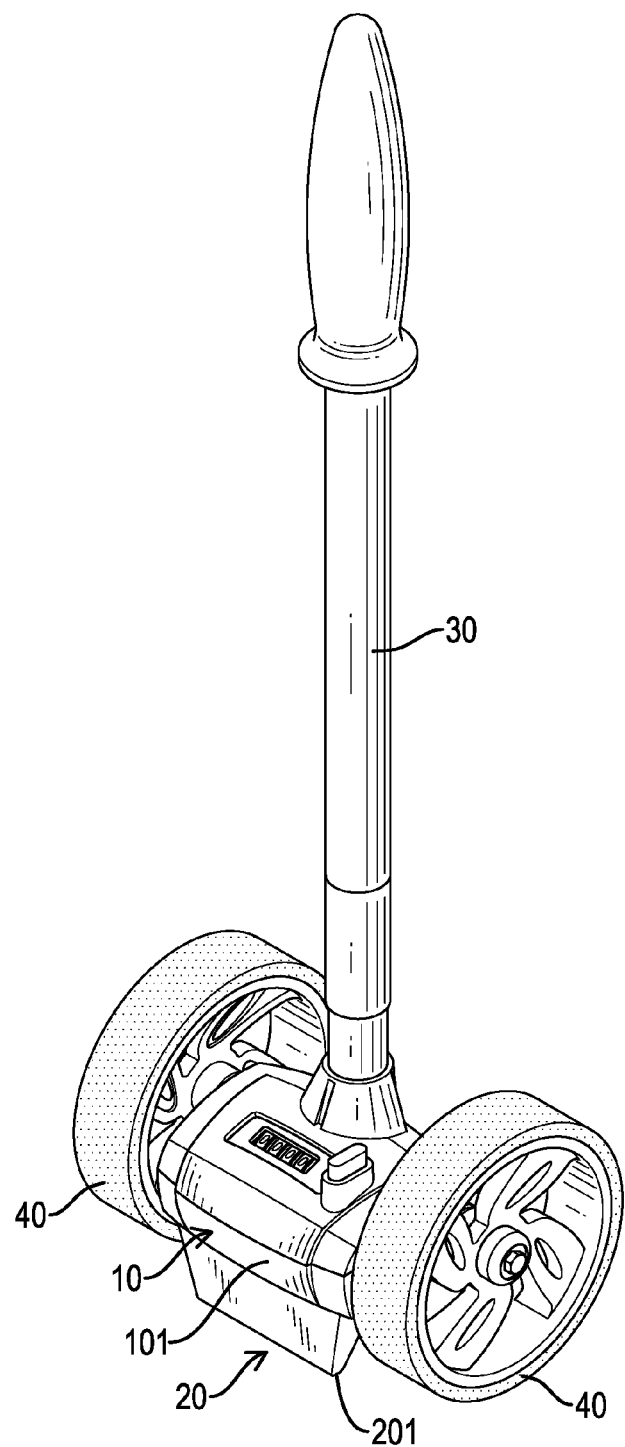
FIG. 1 is a perspective view of a first embodiment of a surveyor wheel in accordance with the present invention.
Figure 2:
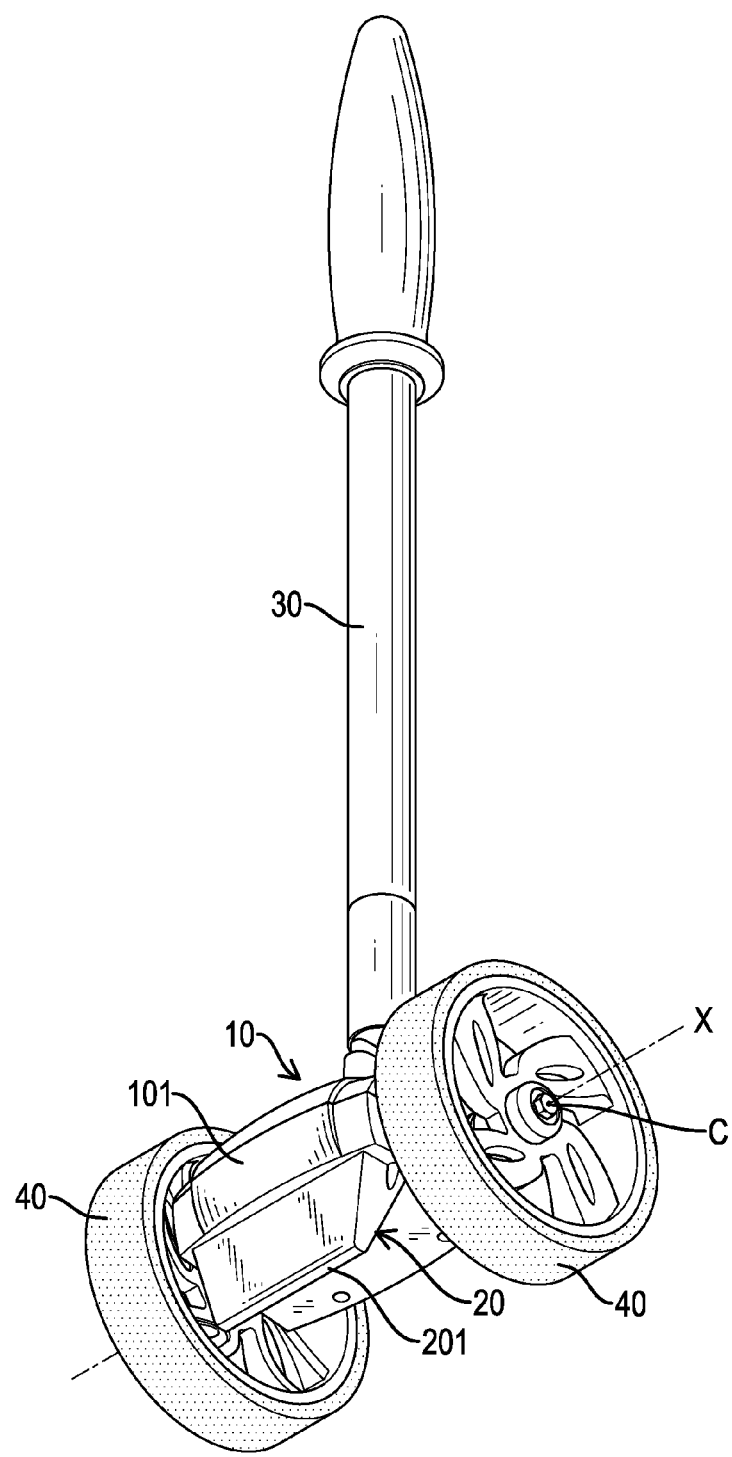
FIG. 2 is another perspective view of the surveyor wheel in FIG. 1.

With reference to FIGS. 1, and 2, a first embodiment of a surveyor wheel in accordance with the present invention has an assembling seat 10, a supporting element 20, a handle 30, and two wheels 40. The supporting element 20 is disposed on the assembling seat 10. The handle 30 and the two wheels 40 are connected to the assembling seat 10.

With reference to FIGS. 1 and 2, the assembling seat 10 has a moving direction, an upper surface, a lower surface, two opposite ends, a first lateral surface 101, and a second lateral surface 102. The upper surface of the assembling seat 10 and the lower surface of the assembling seat 10 are opposite each other. The first lateral surface 101 of the assembling seat 10 and the second lateral surface 102 of the assembling seat 10 are opposite each other in the moving direction of the assembling seat 10.

Figure 3:
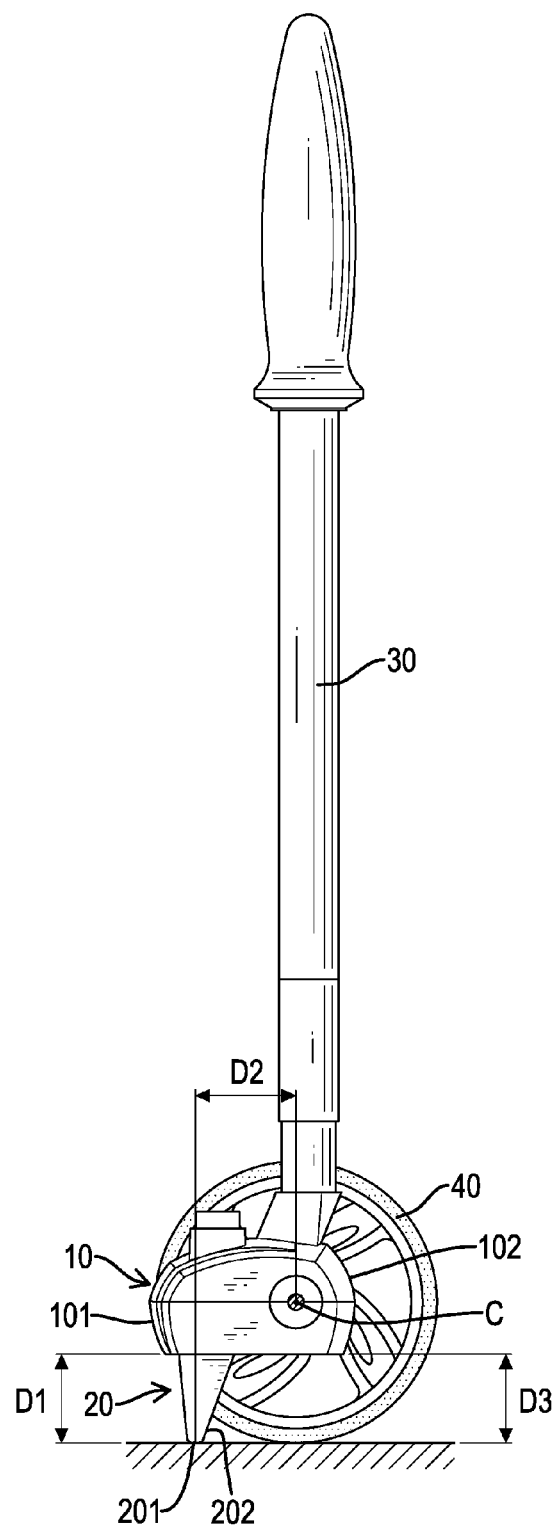
FIG. 3 is a side view in partial section of the surveyor wheel in FIG. 1.

With reference to FIGS. 1, 2 and 3, the supporting element 20 is formed on the lower surface of the assembling seat 10 and has a supporting end 201. In the first embodiment, the supporting element 20 is integrally formed on the lower surface of the assembling seat 10. The assembling seat 10 and the supporting element 20 are formed as a unitary part. The supporting element 20 protrudes downward to form the supporting end 201. The supporting end 201 and the lower surface of the assembling seat 10 are separated by a first distance D1. The supporting end 201 is to abut against the ground or a horizontal surface. The supporting element 20 is shaped as a triangular prism and has an inclined face 202 and two opposite ends. The inclined face 202 and the second lateral surface 102 face to a same direction. The two opposite ends of the supporting element 20 respectively face to the two opposite ends of the assembling seat 10.

With reference to FIGS. 1 and 2, the handle 30 is connected to the upper surface of the assembling seat 10. The handle 30 is telescopic to adjust a length of the handle 30.

With reference to FIGS. 1, 2 and 3, each wheel 40 has a rotating center C and a lower rim. The two rotating centers C are passed through by an axis X. Each rotating center C and the supporting end 201 of the supporting element 20 are separated by a second distance D2 in the moving direction of the assembling seat 10. Each lower rim and the lower surface of the assembling seat 10 are separated by a third distance D3. The two wheels 40 are rotatable and are respectively connected to the two opposite ends of the assembling seat 10. The two wheels 40 drive the assembling seat 10 forward or backward along the moving direction of the assembling seat 10. The third distance D3 between the lower surface of the assembling seat 10 and each lower rim are equal to the first distance D1 between the lower surface of the assembling seat 10 and the supporting end 201.

With reference to FIG. 3, when the standable surveyor wheel is not in use, the supporting end 201 of the supporting element 20 abuts against the ground for a supporting purpose.

Figure 4:
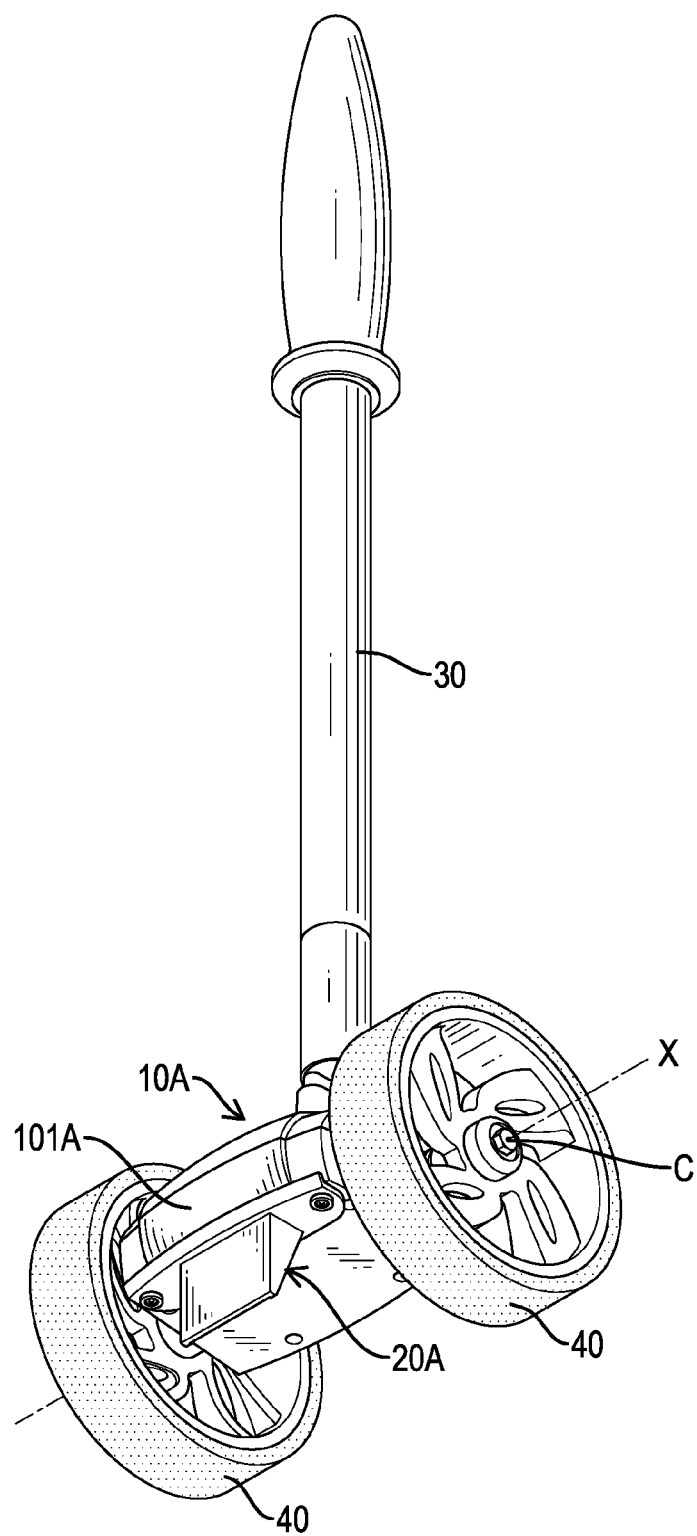
FIG. 4 is a perspective view of a second embodiment of a surveyor wheel in accordance with the present invention.
Figure 5:
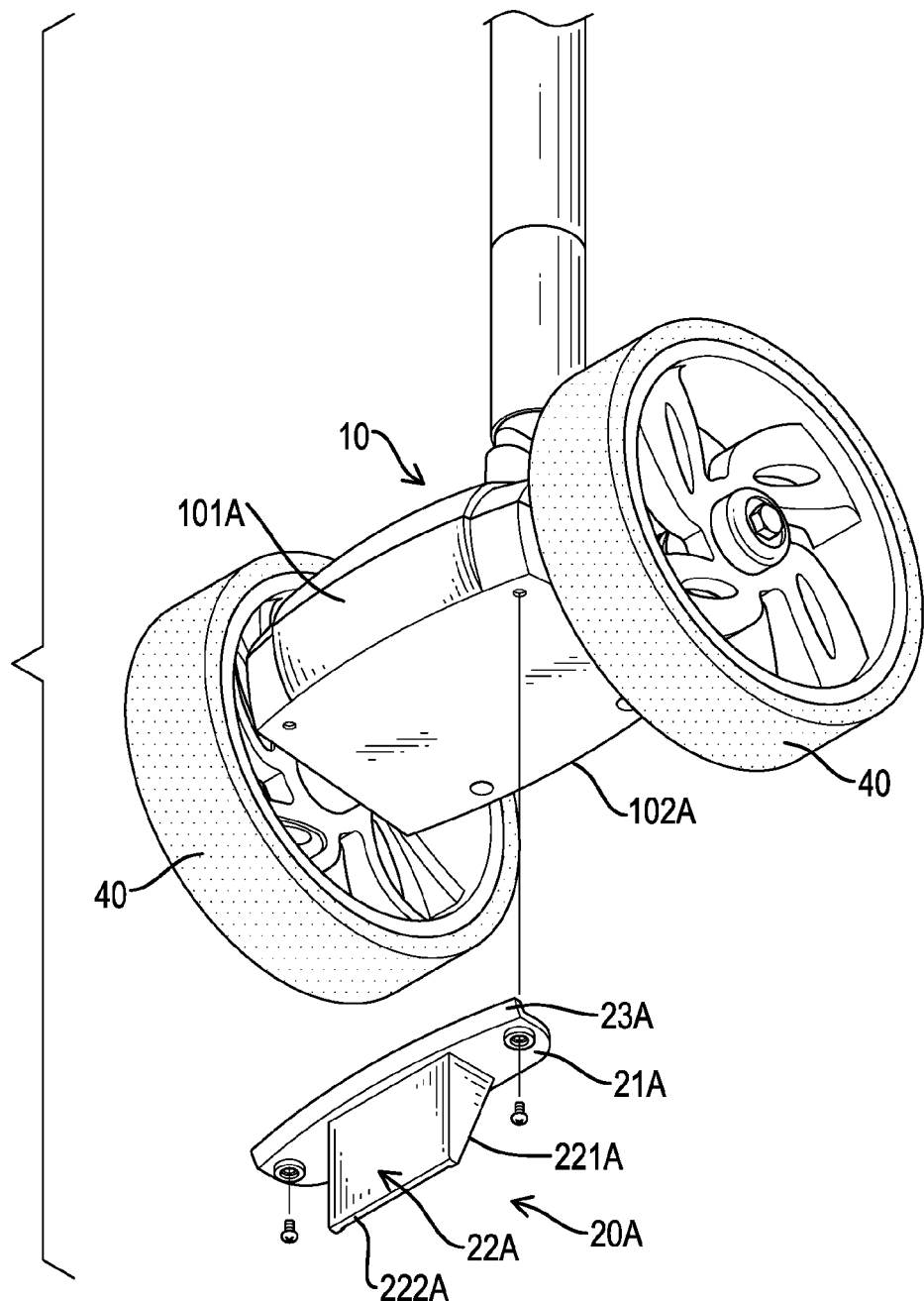
FIG. 5 is an exploded perspective view of the surveyor wheel in FIG. 4.

With reference to FIGS. 4 and 5, the second embodiment in accordance with the present invention has the assembling seat 10A, the supporting element 20A mounted on the lower surface of the assembling seat 10A, the handle 30 mounted on the upper surface of the assembling seat 10A, and the two wheels 40 respectively connected to the two opposite ends of the assembling seat 10A. In the second embodiment, the assembling seat 10A and the supporting element 20A are two different parts that are able to be mounted with and demounted from each other. The supporting element 20A has a connecting portion 21A, a supporting portion 22A, and an abutting edge 23A. The connecting portion 21A is assembled on the lower surface of the assembling seat 10A and has a first surface and a second surface. The first surface of the connecting portion 21A and the second surface of the connecting portion 21A are opposite each other. The second surface of the connecting portion 21A abuts against the lower surface of the assembling seat 10A. The supporting portion 22A is integrally formed on the first surface of the connecting portion 21A, is shaped as a triangular prism, and has an inclined face 221A, two opposite ends, and a supporting end 222A. The inclined face 221A and the second lateral surface 102A of the assembling seat 10A face to a same direction. The inclined face 221A faces to the axis X passing through the two rotating centers C of the two wheels 40. The two opposite ends of the supporting portion 22A respectively face to the two opposite ends of the assembling seat 10A. The abutting edge 23A is formed on the second surface of the connecting portion 21A and abuts against the first lateral surface 101A of the assembling seat 10A. In the second embodiment, two bolts are mounted through the connecting portion 21A and are screwed with the assembling seat 10A to fasten the supporting element 20A with the assembling seat 10A.

In the first embodiment and the second embodiment, the supporting element 20, 20A is implemented as one in amount. The supporting element 20, 20A may be implemented as one or multiple in amount. In the second embodiment, the supporting portion 22A may be also implemented as one or multiple in amount.

With reference to FIGS. 3 and 5, in the first embodiment, the first distance D1 between the lower surface of the assembling seat 10 and the supporting end 201 is equal to the third distance D3 between the lower surface of the assembling seat 10 and each lower rim. The first distance D1 may be smaller than the third distance D3 to achieve a better balance. In the second embodiment, the first distance D1 between the lower surface of the assembling seat 10A and the supporting end 222A may also be smaller than the third distance D3 between the lower surface of the assembling seat 10A and each lower rim.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A surveyor wheel comprising:
    an assembling seat having
        a moving direction;
        an upper surface;
        a lower surface opposite the upper surface of the assembling seat; and
        two opposite ends;
    a supporting element disposed on the assembling seat, protruding downward, and having a supporting end;
    a handle mounted on the assembling seat; and
    two wheels rotatably and respectively connected to the two opposite ends of the assembling seat, wherein
        each of the two wheels has a rotating center separated from the supporting end by a first distance in the moving direction of the assembling seat;
        the two rotating centers of the two wheels are passed through by an axis.

2. The surveyor wheel as claimed in claim 1, wherein the supporting element is integrally formed on the lower surface of the assembling seat.

3. The surveyor wheel as claimed in claim 2, wherein the supporting element is shaped as a triangular prism and has
    an inclined face facing to the axis passing through the two rotating centers of the two wheels; and
    two opposite ends respectively facing to the two opposite ends of the assembling seat.

4. The surveyor wheel as claimed in claim 3, wherein
    the supporting end is separated by a second distance from the lower surface of the assembling seat;
    each of the two wheels has a lower rim separated by a third distance from the lower surface of the assembling seat; and
    the second distance is equal to the third distance.

5. The surveyor wheel as claimed in claim 3, wherein
    the supporting end is separated by a second distance from the lower surface of the assembling seat;
    each of the two wheels has a lower rim separated by a third distance from the lower surface of the assembling seat; and
    the second distance is smaller than the third distance.

6. The surveyor wheel as claimed in claim 1, wherein the supporting element is connected to the lower surface of the assembling seat.

7. The surveyor wheel as claimed in claim 6, wherein the supporting element has
    a connecting portion having
        a first surface; and
        a second surface opposite the first surface of the connecting portion; and
    a supporting portion formed on the first surface of the connecting portion.

8. The surveyor wheel as claimed in claim 7, wherein
    the assembling seat has a first lateral surface facing opposite to the axis passing through the two rotating centers of the two wheels; and
    the supporting element has an abutting edge formed on the second surface of the connecting portion and abutting against the first lateral surface of the assembling seat.

9. The surveyor wheel as claimed in claim 8, wherein the supporting portion is shaped as a triangular prism and has
    an inclined face facing to the axis passing through the two rotating centers of the two wheels; and
    two opposite ends respectively facing to the two opposite ends of the assembling seat.

10. The surveyor wheel as claimed in claim 9, wherein
    the supporting end is separated by a second distance from the lower surface of the assembling seat;
    each of the two wheels has a lower rim separated by a third distance from the lower surface of the assembling seat; and
    the second distance is equal to the third distance.

11. The surveyor wheel as claimed in claim 10, wherein
    the supporting end is separated by a second distance from the lower surface of the assembling seat;
    each of the two wheels has a lower rim separated by a third distance from the lower surface of the assembling seat; and
    the second distance is smaller than the third distance.

* * * * *